United States Patent
Ngo et al.

(10) Patent No.: US 9,885,735 B2
(45) Date of Patent: Feb. 6, 2018

(54) SENSOR DEVICE THAT PROVIDES FORCE VERSUS ACCELERATION INFORMATION

(71) Applicant: OES, Inc., London (CA)

(72) Inventors: Kiet Ngo, Ontario (CN); Ashkan Rasouli, London (CA); Jean-Paule Mongeau Grice, Springfield (CA)

(73) Assignee: OES, INC., London, Ontario (CA)

( * ) Notice: Subject to any disclaimer, the term of this patent is extended or adjusted under 35 U.S.C. 154(b) by 526 days.

(21) Appl. No.: 14/543,124

(22) Filed: Nov. 17, 2014

(65) Prior Publication Data

US 2016/0138981 A1    May 19, 2016

(51) Int. Cl.

| | |
|---|---|
| *G01P 15/13* | (2006.01) |
| *G01P 15/03* | (2006.01) |
| *G01L 1/16* | (2006.01) |
| *G01P 15/02* | (2013.01) |
| *G01L 5/00* | (2006.01) |

(52) U.S. Cl.
CPC .............. *G01P 15/133* (2013.01); *G01L 1/16* (2013.01); *G01L 1/162* (2013.01); *G01L 1/165* (2013.01); *G01L 5/0076* (2013.01); *G01P 15/02* (2013.01); *G01P 15/03* (2013.01); *G01P 15/032* (2013.01); *G01P 15/13* (2013.01)

(58) Field of Classification Search
CPC . G01L 1/16; G01L 1/162; G01L 1/165; G01P 15/02; G01P 15/03; G01P 15/032; G01P 15/13; G01P 15/133
See application file for complete search history.

(56) References Cited

U.S. PATENT DOCUMENTS

| | | | |
|---|---|---|---|
| 6,169,540 B1* | 1/2001 | Rosenberg | G05G 9/047 345/157 |
| 7,968,841 B2 | 6/2011 | Csutak | |
| 2002/0163498 A1* | 11/2002 | Chang | G06F 3/016 345/156 |
| 2004/0204811 A1* | 10/2004 | Huang | G06F 3/016 701/50 |
| 2010/0095778 A1* | 4/2010 | Sato | G01L 9/008 73/756 |
| 2011/0061455 A1* | 3/2011 | Payton | G01V 7/04 73/152.59 |
| 2011/0218756 A1* | 9/2011 | Callsen | F41H 1/04 702/139 |
| 2013/0171422 A1* | 7/2013 | De Luca | B65D 81/03 428/172 |

(Continued)

OTHER PUBLICATIONS

Rtirado, "Newton's Laws I," Oct. 14, 2014, http://www.uccs.edu/Documents/rtirado/PES_1150_Lab4.pdf.*

(Continued)

*Primary Examiner* — Joseph C Nicely
(74) *Attorney, Agent, or Firm* — Carlson, Gaskey & Olds

(57) ABSTRACT

An illustrative example embodiment of a sensing device includes a force sensor that detects a force and provides an output indicative of the detected force. An acceleration sensor detects acceleration and provides an output indicative of the detected acceleration. A processor receives the output from the force sensor and the acceleration sensor. The processor provides an indication of a relationship between the detected force and the detected acceleration.

20 Claims, 3 Drawing Sheets

(56) References Cited

U.S. PATENT DOCUMENTS

| | | | | |
|---|---|---|---|---|
| 2013/0192356 A1* | 8/2013 | De Graff | ............... | G01V 9/00 |
| | | | | 73/152.01 |
| 2014/0090471 A1* | 4/2014 | Hsu | ............... | G01C 19/5712 |
| | | | | 73/514.29 |
| 2014/0230581 A1* | 8/2014 | Nakatani | ............... | G01L 5/009 |
| | | | | 73/865 |
| 2016/0190904 A1* | 6/2016 | Hampton | ............... | F03G 7/10 |
| | | | | 310/12.14 |

OTHER PUBLICATIONS

Bilski v Kappos, Syllabus, Oct. 2009.*
United States Patent and Trademark Office, "Dec. 2016: Interim Eligibility Guidance Quick Reference Sheet".*
"Force Acceleration and Torque Tutorial," Apr. 12, 2007, http://ee.sharif.edu/~industrialcontrol/Force_Aceeleration_and_Torque_Tutuorial.pdf.*

* cited by examiner

SENSOR DEVICE THAT PROVIDES FORCE VERSUS ACCELERATION INFORMATION

BACKGROUND

There are a variety of manufacturing processes that are monitored for quality control purposes. One example is in the wire harness industry in which a plurality of wires are manipulated as part of the harness assembly procedures. For example, crimping machines exert a force on the wires for establishing connections between wire ends and connectors. Force monitors have been used to observe the forces applies during crimping for purposes of attempting to monitor the quality of the resulting connections. Other manufacturing processes have similar characteristics and force monitoring is useful in those contexts.

Typical force monitoring processes obtain force information and observe it over time. One of the difficulties associated with that approach is that it is challenging to ensure that a force compared to time signature occurs at the appropriate processing stage because earlier or later signatures are typically not distinguishable from each other.

Another approach is to monitor force compared to displacement. This approach avoids the drawbacks associated with monitoring force over time but it requires tracking displacement of the machinery involved in the process under observation. Part of the challenge associated with this approach is ensuring that any position sensor is reliably and conveniently situated on the machine under observation. Another shortcoming of many approaches that use position or displacement is that it only provides information at discrete intervals or steps and that limits the amount of available information.

Another challenge associated with known force monitoring techniques is that the changes in the resulting force during a manufacturing process from one iteration to another can be relatively minor yet the resulting products may have significant quality differences. The relatively minor changes in force can be difficult to detect which may lead to a failure to identify defective products or potential issues in a manufacturing process.

SUMMARY

An illustrative example embodiment of a sensing device includes a force sensor that detects a force and provides an output indicative of the detected force. An acceleration sensor detects acceleration and provides an output indicative of the detected acceleration. A processor receives the output from the force sensor and the acceleration sensor. The processor provides an indication of a relationship between the detected force and the detected acceleration.

In an example embodiment of a sensing device having one or more features described in the previous paragraph, the indication provided by the processor comprises a graphical representation of the relationship between the detected force and the detected acceleration during at least a selected portion of a machine operation.

In an example embodiment having one or more features of either of the previous paragraphs, the sensing device includes a display that shows the graphical representation.

In an example embodiment having one or more features of any of the previous paragraphs, the graphical representation includes a first axis providing a reference of force values, a second axis providing a reference of acceleration values, and a curve representing the relationship. The curve is based on corresponding force and acceleration values.

In an example embodiment having one or more features from any of the previous paragraphs, the force sensor comprises at least one piezoelectric component and the acceleration sensor comprises at least one accelerometer.

In an example embodiment having one or more features of any of the previous paragraphs, the force sensor comprises a piezoelectric element comprising at least one of quartz, ceramic or a polymer; and the acceleration sensor comprises a MEMS accelerometer.

In an example embodiment having one or more features of any of the previous paragraphs, the processor comprises a microprocessor; and the force sensor, the acceleration sensor and the microprocessor are all supported on a single substrate.

In an example embodiment having one or more features of any of the previous paragraphs, the processor provides the indication of the relationship over a selected interval of time corresponding to a machine operation.

An illustrative example embodiment of a method includes using a force sensor for detecting a force and using an acceleration sensor for detecting acceleration. The method includes determining a relationship between force and acceleration based on the detected force and the detected acceleration. The determined relationship is used as an indicator of at least one of a quality of machine operation that involved the detected force and the detected acceleration, a quality of a manufacturing process that involved the detected force and the detected acceleration, or a quality of a part having at least one characteristic corresponding to at least the detected force.

In an example embodiment having one or more features of the previous paragraph, the method includes providing a graphical representation of the determined relationship for a plurality of detected force values and a corresponding plurality of acceleration values.

An example embodiment having one or more features of either of the previous paragraphs includes displaying the graphical representation.

In an example embodiment having one or more features of any of the previous paragraphs, the graphical representation includes a first axis providing a reference of force values, a second axis providing a reference of acceleration values, and a curve corresponding to the relationship where the curve is based on the plurality of corresponding values.

In an example embodiment having one or more features of any of the previous paragraphs, the force sensor comprises at least one piezoelectric component and the acceleration sensor comprises at least one accelerometer.

In an example embodiment having one or more features of any of the previous paragraphs, the force sensor comprises a piezoelectric component comprising at least one of quartz, ceramic or a polymer; and the acceleration sensor comprises a MEMS accelerometer.

In an example embodiment having one or more features of any of the previous paragraphs, the processor determines the relationship; the process comprises a microprocessor; and the force sensor, the acceleration sensor and the microprocessor are all supported on a single substrate.

An example embodiment having one or more features of any of the previous paragraphs includes providing an indication of the relationship over a selected interval of time corresponding to a machine operation.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention provide information regarding a relationship between force and acceleration that is useful for monitoring machine operation, manufacturing processes, part quality, or a combination of these. The relationship between force and acceleration is dynamic and provides continuous feedback regarding the machine, process or part under observation. Moreover, the relationship between force and acceleration allows for more reliably detecting differences among various machine operations, manufacturing processes, produced parts or a combination of these. Embodiments of this invention provide a noticeable and reliable indicator of differences even under circumstances where those differences are associated with relatively minor changes in detectable force.

Figure 1:
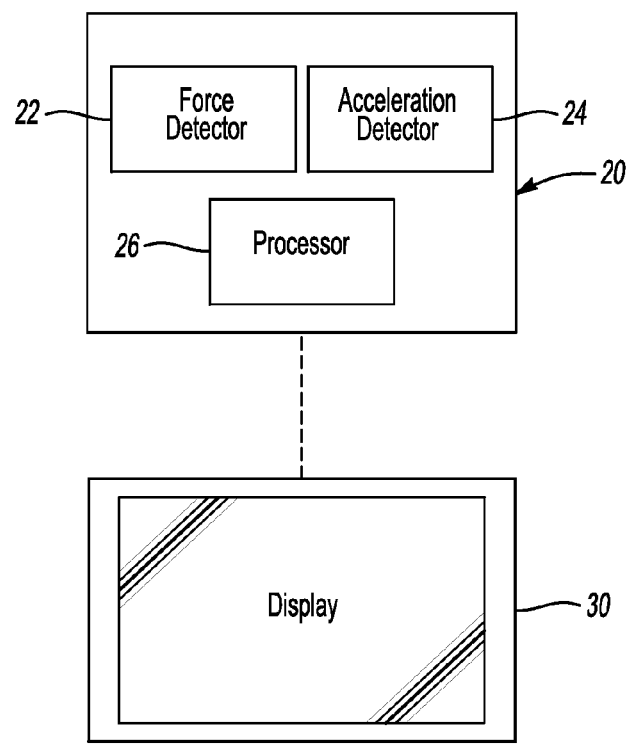
FIG. 1 schematically illustrates a sensing device designed according to an embodiment of this invention.

FIG. 1 schematically shows an example sensing device 20. A force sensor 22 detects a force and provides an output indicative of the detected force. An acceleration sensor 24 detects acceleration and provides an output indicative of the detected acceleration. A processor 26 receives the output from the force sensor 22 and the acceleration sensor 24. The processor 26 determines a relationship between force and acceleration. In some examples, the indication from the processor includes a graphical representation of the relationship between force and acceleration that is based upon a plurality of detected force values and a corresponding plurality of detected acceleration values.

The example of FIG. 1 includes a display 30 associated with at least the processor 26 for presenting a visible output regarding the determined relationship between force and acceleration. In some embodiments, the display 30 is situated in an appropriate location within a manufacturing environment where an individual can observe the determined relationship between force and acceleration. The individual can then make an informed, reliable decision regarding at least one characteristic or quality of a manufacturing process, at least a portion of a machine operation, or a part quality.

Figure 2:
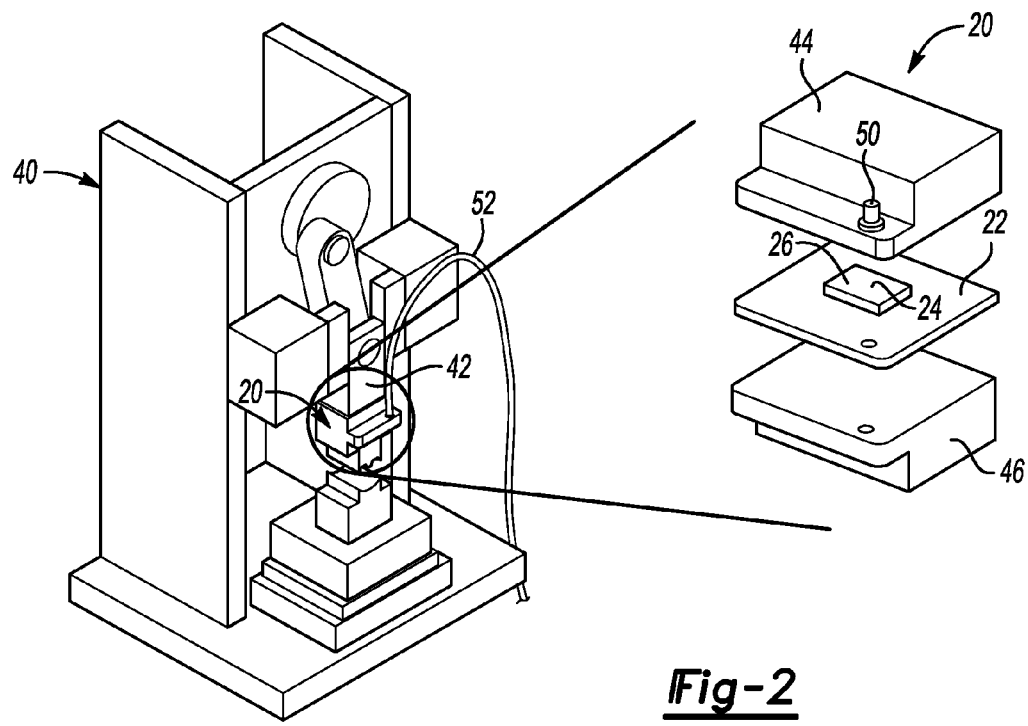
FIG. 2 diagrammatically illustrates an example embodiment of a sensing device situated on an example machine.

FIG. 2 illustrates an example machine 40 with which an embodiment of a sensing device designed according to this invention may be used. In this example, the machine 40 is a C-frame crimping press that may be used for crimping wire terminals, which may be used as part of a wire harness, for example. The machine 40 is provided as one example machine with which the sensing device 20 may be utilized for discussion purposes. Other machines or manufacturing processes may also be used.

In this embodiment, the sensing device 20 is situated on a moving arm of the press so that the force sensor 22 may detect forces associated with the wire crimping procedure and the acceleration sensor 24 may detect acceleration associated with movement of the press arm. One of the characteristics of the illustrated embodiment of the sensing device 20 is that it is a compact and efficient arrangement of components, which are shown in an exploded view on the right side of the drawing. In this example, the force sensor 22, acceleration sensor 24 and the processor 26 are situated between mechanical coupling members 44 and 46 that are configured to be received on a selected portion of the machine 40, such as the press arm.

One of the features of the example of FIG. 2 is that the force sensor 22, acceleration sensor 24 and processor 26 are all supported on a single substrate. In this example, the force sensor 22 comprises a piezoelectric component. In one example embodiment, the force sensor 22 is a piezoelectric component, such as a film, designed according to the teachings of U.S. Pat. No. 7,603,909. The force sensor may comprise quartz, ceramic, a polymer or a combination of these.

The acceleration sensor 24 in some embodiments comprises an accelerometer, which may be configured to provide information regarding one, two or three directions of movement. In one embodiment the sensor 24 comprises a MEMS accelerometer. One advantage to using such an accelerometer is that it is compact in size and can be accommodated on a printed circuit board along with a microprocessor. The processor 26 in this example comprises such a microprocessor. Utilizing a relatively thin piezoelectric element, a small-sized accelerometer and a small microprocessor allows for establishing a compact and easy-to-place sensing device that can be incorporated onto or with a variety of machines for monitoring a variety of manufacturing processes.

Another feature of the example of FIG. 2 is that the sensing device 20 includes a single connector 50 that may be associated with a conductor 52 for communicating information gathered by the sensing device 20 to monitor equipment, such as computing devices or one or more displays such as the display 30. Having a single connector that allows for communications with the force sensor 22, accelerator sensor 24 and processor 26 and for providing power to those elements as may be needed makes it easier to incorporate the sensing device into a manufacturing environment in a less obtrusive manner and without requiring any alterations to the machinery of interest.

Figure 3:
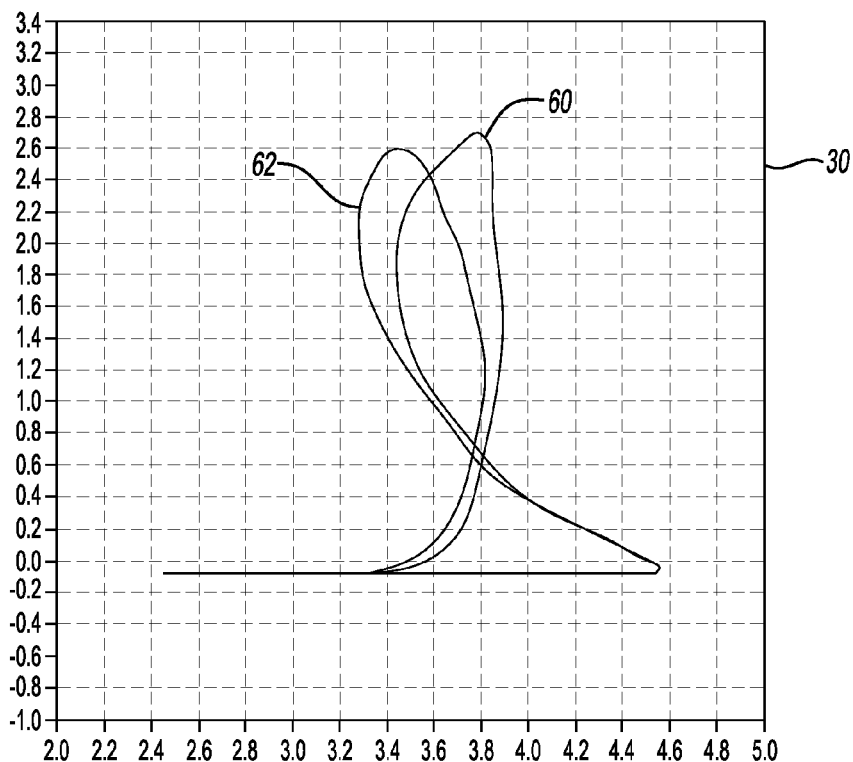
FIG. 3 illustrates a graphical representation of a relationship between force and acceleration during an example machine operation.

The processor 26 determines a relationship between force and acceleration and provides an indication of that relationship. FIG. 3 illustrates one example indication configuration. In this example, the relationship between force and acceleration is represented graphically in a plot of a plurality of corresponding force and acceleration values. One of the features of FIG. 3 is that it illustrates the significant differences between the graphical representation of the relationship between force and acceleration for different processes or parts. In this example, a curve 60 represents an ideal or desired relationship between force and acceleration when the manufacturing process occurs according to plan and the resulting component meets manufacturing tolerances. Another curve 62 illustrates the relationship between force and acceleration for a part that is questionable or outside of manufacturing tolerances because of a defect in the part components or an issue or complication during the process involving machine operation.

Considering a crimping press operation, the forces and acceleration involved in the machine operation result in a relationship having a graphical representation like that shown in FIG. 3. Even though there are relatively minute changes in the dynamics and kinematics of the crimping press ram, the ability to recognize or detect a faulty crimping cycle and potentially defective resulting part is enhanced because of the consideration of the relationship between force and acceleration. That relationship demonstrates more significant variation compared to simply monitoring force itself during the two processes. A relatively minor change in force caused by a slight difference in the material presented to the crimping press can yield a signature having a noticeable difference such as the difference between the curves 60 and 62 in FIG. 3.

Figure 4:
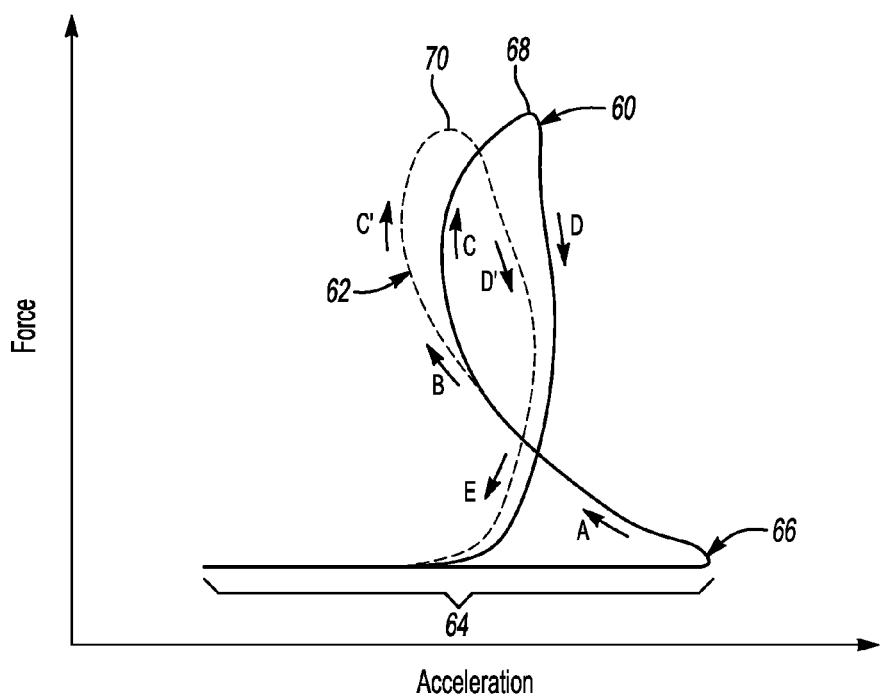
FIG. 4 graphically illustrates selected features of a graphical representation of a relationship between force and acceleration that can be determined using an example embodiment of this invention.

FIG. 4 represents the curves 60 and 62 with additional notation for purposes of understanding how the force versus acceleration relationship conveys information regarding the process occurring while the crimping press is in operation. The graphical representation in FIG. 4 is presented with respect to reference axes where the vertical axis contains a plurality of reference force values and the horizontal axis includes a plurality of reference acceleration values. Considering the curve 60 first, the initial portion of the curve is shown at 64 while the press arm is advancing toward the wire terminal to be crimped. The force sensor 22 provides essentially no output because there is nothing preventing the press arm from moving in the intended direction. The force value along the portion of the curve shown at 64 may be considered zero in some examples. When the press arm advances far enough to make contact with the wire terminal, the force sensor 22 detects the force of impact and a sharp turn in the curve 60 occurs at 66. The force used for crimping the wire terminal increases while the acceleration value decreases as shown along the portion of the curve labeled A. As the press arm continues to move further in the force applying direction, the amount of force continues to increase and the press arm continues to decelerate along the portions of the curve 60 shown at B and C.

Eventually, the crimping tool reaches its ultimate position in the direction it moves for accomplishing the crimping (e.g., the bottom dead center position). As the machine's applied compression force on the material is released, the press arm and crimping tool begin to move in an opposite direction to return to a rest or initial position. This change in direction is detected as a rapid increase in acceleration that fairly quickly diminishes as the crimping tool detaches from the material and begins to retract to its initial position. At the same time the detected force drops rapidly. The relationship between force and acceleration during this portion of the process is shown along the portion of the curve labeled D. The press arm continues to retreat, which results in further change in the detected acceleration in an opposite direction compared to the initial movement resulting in the curve returning back toward an initial position, as represented by the portion of the curve labeled E.

Considering the curve 60 as an ideal or desired force versus acceleration representation, the resulting part (i.e., a crimped wire) will meet the intended specifications within designed tolerance. The curve 62 represents another procedure using a different wire where there is a defect compared to the idealized or desired arrangement. In this example, assume that a portion of the wire that should have a thin layer of insulation on it is missing that insulation material. Under these circumstances, the acceleration values detected by the acceleration sensor 24 decrease to a lower value before the crimping tool completes its work and the crimping or compression force will be slightly lower. As a result, the acceleration of the press arm at the moment the crimping tool reverses direction is lower with the defective wire compared to the ideal or desired crimping process. This slight change in the characteristic of the wire presented for crimping causes the force versus acceleration curve 62 to be considerably shifted to the left (according to the drawing) compared to the curve 60. For example, the portions of the curves shown at C and C' are recognizably distinct from each other as are the portions shown at D and D', respectively.

The peak force shown at 68 and the peak force shown at 70 are different but the difference in magnitude may not be significant enough to provide a reliable indicator of whether the monitored process, machine or resulting part is acceptable if one were considering force alone or even force with respect to time or position. It is only when the relationship between force and acceleration is taken into account that the relatively dramatic and observable changes become apparent as illustrated.

Additionally, observing the relationship between force and acceleration provides enhanced capabilities for monitoring machines, manufacturing processes, and evaluating resulting components or parts. The example device allows for monitoring force and acceleration on a continuous basis providing a dynamic relationship throughout the course of a manufacturing process or operation. With a sensor designed according to an embodiment of this invention, a more detailed analysis with higher granularity becomes possible. This allows for enhanced analysis of the conditions in a manufacturing environment and of the resulting parts.

In addition to providing visibly noticeable changes such as those illustrated in FIGS. 3 and 4, the determined relationship between force and acceleration provided by the processor 26 may be analyzed using a computing device that is suitably programmed to recognize changes in the relationship that may have an impact on the characteristic of interest.

There are situations in which the machine involved in a monitored process experiences additional forces, such as tension. The example sensing device and its output allows for detecting such forces or accounting for how such forces may indicate a defective part or process. For example, as the press arm advances during a crimping operation as described above, the machine or press frame is placed into tension and the material of the frame extends similar to the action of a spring system. As the machine's applied force is released at the completion of the crimp, the tension begins to release and the press frame retracts to its resting position. The machine frame is effectively bounced back by the energy stored in the frame that undergoes tension during the crimping process, which causes acceleration in the direction of press arm retraction due to the large amount of energy released from the tension in the frame. The effect of such acceleration may be discerned from the characteristics of the curve that demonstrates the relationship between force and acceleration and that information may be used in an analysis of a manufacturing process or a resulting part.

For example, in the case of a wire with less than the ideal amount of insulation near the location of the crimp less tension builds up in the frame during crimping. The lower tension in the frame affects the measured force during the crimp and yields less acceleration upon release of the machine's crimping force. Differences between the resulting relationship between force and acceleration and an ideal relationship, therefore, may be discerned from the output of the example sensing device.

Figure 5:
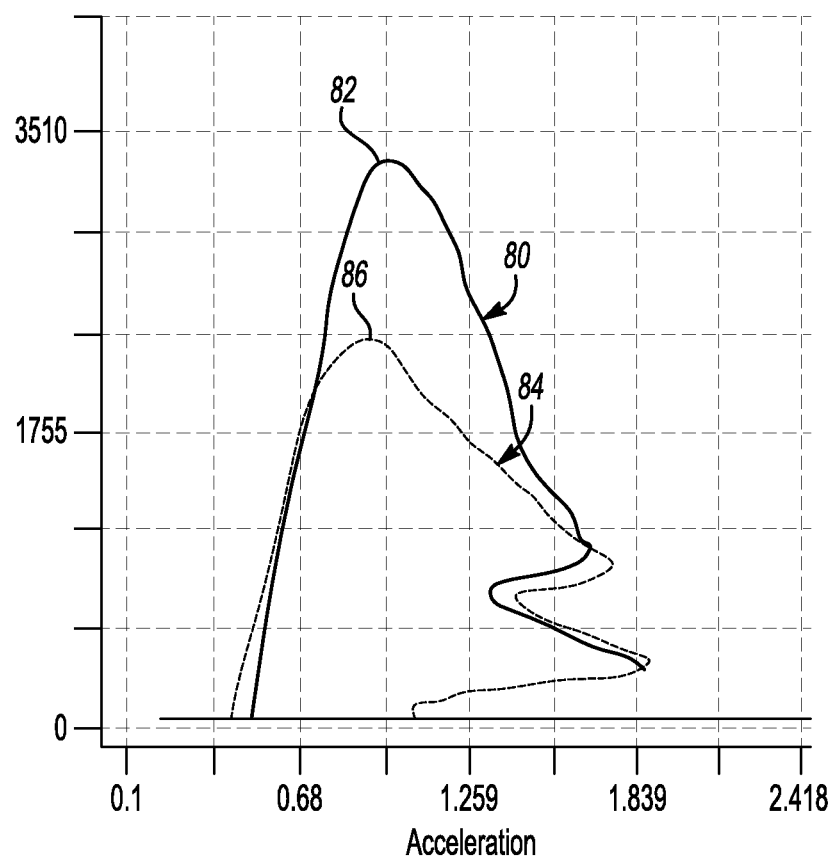
FIG. 5 is a graphical representation of another example relationship between force and acceleration.

A variety of force versus acceleration signatures or graphic representations are possible depending on the particular equipment, operation or products involved. FIG. 5 graphically illustrates a curve 80 that represents force versus acceleration during a procedure in which a wire harness terminal is crimped onto wire. The curve 80 represents a desired or ideal relationship between force and acceleration for a properly positioned wire that has no defects and an associated terminal being crimped onto that wire. Another curve 84 represents a less than ideal condition that may result in a defective part, for example. The curve 84 includes a peak force shown at 86 and a different rate of change in acceleration after that peak force. The curve 84 may result from a conductor being positioned relative to the wire harness terminal with some of the insulation around the wire being in a position where exposed wire is expected. Having insulation in the crimp core is one type of error that may occur while assembling wire harness components. The force versus acceleration relationship graphically illustrated in FIG. 5 demonstrates how the disclosed example sensing device provides useful information to detect such conditions.

Additionally, the example sensing device 20 may provide speed or position information based on the detected acceleration. For example, it is possible to integrate the detected acceleration to determine speed or to integrate the detected acceleration twice to determine position.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A machine assembly, comprising:
a machine having at least one portion that configures at least one part of an object;
a sensing device including
a force sensor that detects a force associated with configuring the at least one part of the object and provides a detected force output indicative of the detected force; and
an acceleration sensor that detects acceleration associated with configuring the at least one part of the object and provides a detected acceleration output indicative of the detected acceleration; and
a processor configured to receive the detected force output and the detected acceleration output, the processor being configured to determine a relationship between the detected force and the detected acceleration, the processor being configured to provide a quality control output that indicates whether the determined relationship corresponds to a desired relationship between the force and acceleration when configuring the at least one part of the object.

2. The machine assembly of claim 1, wherein the quality control output provided by the processor comprises a graphical representation of the relationship between a plurality of values of the detected force and a corresponding plurality of values of the detected acceleration.

3. The machine assembly of claim 2, comprising a display that shows the graphical representation.

4. The machine assembly of claim 2, wherein
the graphical representation comprises a first curve that represents the desired relationship and a second curve that represents the determined relationship; and
an amount of visible difference between the first curve and the second curve indicates at least one of
a quality of operation of the machine while configuring the at least one part of the object;
a quality of a process that involved the detected force and the detected acceleration; and
a quality of the at least one part.

5. The machine assembly of claim 2, wherein the graphical representation comprises a curve having
a first portion showing an increasing force and a corresponding decreasing acceleration while the portion of the machine configures the at least one part of the object; and
a second portion showing a decreasing force and a corresponding decreasing acceleration while the portion of the machine returns to an initial position after applying the force to configure the at least one part of the object.

6. The machine assembly of claim 1, wherein
the force sensor comprises a piezoelectric component comprising at least one of quartz, ceramic or a polymer; and
the acceleration sensor comprises a MEMS accelerometer.

7. The machine assembly of claim 1, wherein
the processor comprises a microprocessor; and
the force sensor, the acceleration sensor and the microprocessor are all supported on a single substrate.

8. The machine assembly of claim 1, wherein
the processor provides the quality control output over a selected interval of time corresponding to configuring the at least one part of the object.

9. The machine assembly of claim 1, wherein the detected force is a force applied to configure the at least one part of the object.

10. The machine assembly of claim 1, wherein the detected force is a force experienced by the machine while configuring the at least one part of the object.

11. The machine assembly of claim 10, wherein the detected force is tension experienced by a frame of the machine.

12. A method, comprising:
configuring at least one part of an object using at least a portion of a machine;
using a force sensor for detecting a force associated with configuring the at least one part of the object;
using an acceleration sensor for detecting acceleration associated with configuring the at least one part of the object;
determining a relationship between force and acceleration based on the detected force and the detected acceleration; and
providing a quality control output based on any difference between the determined relationship and a desired relationship between force and acceleration while configuring the at least one part of the object, the quality control output being an indicator of at least one of
a quality of machine operation that involved the detected force and the detected acceleration;
a quality of a manufacturing process that involved the detected force and the detected acceleration; and
a quality of the at least one part of the object, wherein the quality of the at least one part of the object has at least one characteristic corresponding to at least the detected force.

13. The method of claim 12, wherein providing the quality control output comprises
providing a graphical representation of the determined relationship for a plurality of detected force values and a corresponding plurality of acceleration values, wherein the graphical representation comprises a first curve that represents the desired relationship and a second curve that represents the determined relationship and an amount of visible difference between the first curve and the second curve corresponds to the difference between the desired relationship and the determined relationship.

14. The method of claim 13, wherein the graphical representation comprises a first axis providing a reference of force values;

a second axis providing a reference of acceleration values; and a curve representing the relationship, the curve being based on the plurality of corresponding values.

15. The method of claim 13, wherein at least one of the first curve or the second curve comprises a first portion showing an increasing force and a corresponding decreasing acceleration while configuring the at least one part of the object; and a second portion showing a decreasing force and a corresponding decreasing acceleration while after configuring the at least one part of the object.

16. The method of claim 12, wherein the force sensor comprises a piezoelectric component comprising at least one of quartz, ceramic or a polymer; and the acceleration sensor comprises a MEMS accelerometer.

17. The method of claim 12, comprising providing the indication of the relationship over a selected interval of time corresponding to a machine operation.

18. The method of claim 12, wherein the detected force is a force applied to configure the at least one part of the object.

19. The method of claim 12, wherein the detected force is a force experienced by the machine while configuring the at least one part of the object.

20. The method of claim 19, wherein the detected force is tension experienced by a frame of the machine.

* * * * *